United States Patent [19]
Cusick et al.

[11] Patent Number: 5,725,723
[45] Date of Patent: Mar. 10, 1998

[54] APPARATUS FOR MAKING PIPE INSULATION

[75] Inventors: George C. Cusick; Gerald W. Miller, both of Leeds, Ala.

[73] Assignee: Mineral Products & Technology, Inc., Leeds, Ala.

[21] Appl. No.: 650,759

[22] Filed: May 20, 1996

[51] Int. Cl.$^6$ ........................................... B32B 31/18
[52] U.S. Cl. .................... 156/502; 156/517; 156/519; 156/552; 156/562; 156/258; 156/302; 156/270; 156/265; 264/160
[58] Field of Search ........................... 156/258, 302, 156/304.1, 264, 265, 266, 269, 270, 502, 517, 519, 552, 562; 29/415, 416; 264/157, 160; 83/581

[56] References Cited

U.S. PATENT DOCUMENTS

| | | |
|---|---|---|
| 4,838,968 | 6/1989 | Nelson et al. . |
| 4,954,202 | 9/1990 | Price et al. . |
| 5,134,917 | 8/1992 | Holland . |
| 5,302,228 | 4/1994 | Holland . |
| 5,310,594 | 5/1994 | Holland . |

FOREIGN PATENT DOCUMENTS 311881  8/1971  U.S.S.R. .

Primary Examiner—Michael W. Ball
Assistant Examiner—Sam Chuan Yao
Attorney, Agent, or Firm—Veal & Associates

[57] ABSTRACT

In an apparatus for forming pipe insulation discrete panels of generally rigid planar board insulation are fed through a sizing apparatus to control thickness, then fed into a vertically oriented conveyor where adjacent ends of the panels are adhered to one another to form a continuum of panels passing through the conveyor. A horizontally moving severing station cuts the panels into transverse trapezoidal segments, such that each succeeding segment is reversed relative to the adjacent segments with the severing plane being common. A tipping mechanism tips the segments according to their orientation such that all of the segments are received on a horizontal conveyor in the same orientation. An accumulator conveyor abuts the base of each segment against each adjacent segment such that a solid surface is formed for the application a backing to integrate the trapezoidal segments. Alternatively, the panels are sized and end glued on a horizontal conveyor prior to forming a series of trapezoidal segments. In this embodiment every other segment must be inverted to allow for the formation of a contiguous surface by the adjacent bases.

11 Claims, 3 Drawing Sheets

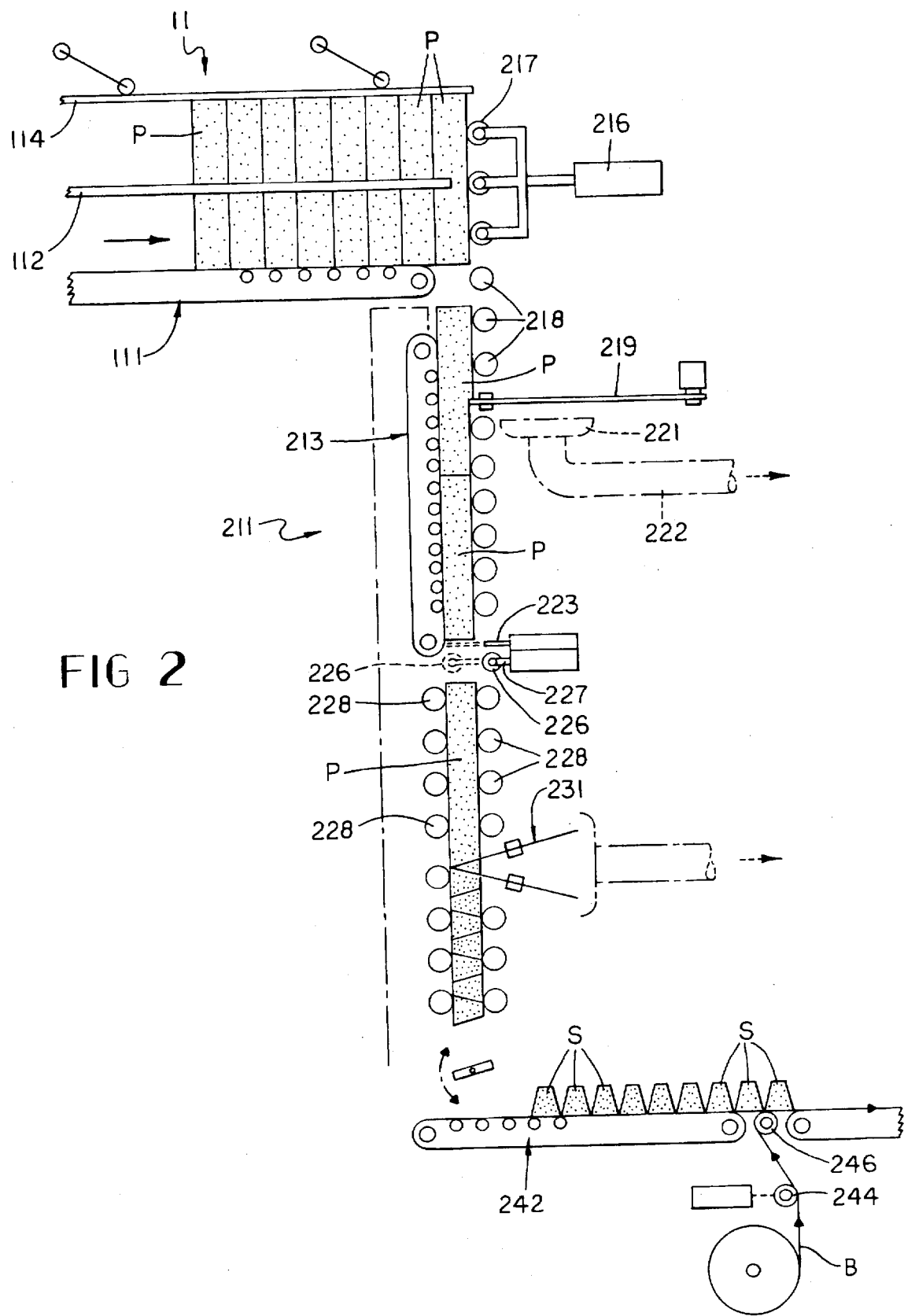

APPARATUS FOR MAKING PIPE INSULATION

FIELD OF THE INVENTION

The present invention relates to tube making apparatus wherein the tube is an insulating product made from a flat rigid stock material. More particularly the present invention relates to the method of using such apparatus and the apparatus wherein rigid flat stock material is severed to form identical trapezoidal segments which are rejoined to form a tube wherein the base of each trapezoid forms a portion of the outer surface of the tube.

BACKGROUND

The assignee of the instant application is the owner of U.S. Pat. Nos. 4,838,968, 4,954,202, 5,310,594, 5,134,917, and 5,302,228. Assignee's business is as a value added remanufacturer of insulation products. Assignee uses machines built in accordance with one or more of the forgoing patents to form notches or v-grooves in flat rigid insulation such a mineral wool board, foam glass board, or the like to enable the board insulation to conform to the outer diameter of industrial piping. A significant problem with such machines is that the material removed from insulation board material is wasted and in many instances cannot be reclaimed in any commercially useful manner. Others in the industry may take blocks of material and remove a core equivalent to the diameter of the pipe to be insulated and shape the outer contour of the block as needed to enable it to be used commercially. Again significant waste results wherein the scrap insulation cores and trimmings cannot be recovered for commercial usage. The amount of material thus wasted generally runs around 30% with some minor variation according to the pipe diameter being insulated.

SUMMARY OF THE INVENTION

It is the primary object of the present invention to provide a method and apparatus for forming tubular insulation materials with minimal waste.

Another object of the invention is to provide a method and apparatus that can be used with a wide variety of materials to provide tubular insulation which may be shipped in a flat state and applied about a pipe on site.

In one embodiment, discrete panels of generally rigid planar board insulation are feed through a sizing apparatus to control thickness, then fed into a vertically oriented conveyor where adjacent ends of the panels are adhered to one another to form a continuum of panels passing through the conveyor. A horizontally moving severing station cuts the panels into transverse trapezoidal segments, such that each succeeding segment is reversed relative to the adjacent segments with the severing plane being common. A tipping mechanism tips the segments according to their orientation such that all of the segments are received on a horizontal conveyor in the same orientation. An accumulator conveyor abuts the base of each segment against each adjacent segment such that a solid surface is formed for the application a backing to integrate the trapezoidal segments.

In another embodiment the panels are sized and end glued on a horizontal conveyor prior to forming a series of trapezoidal segments. In this embodiment every other segment must be inverted to allow for the formation of a contiguous surface by the adjacent bases.

BRIEF DESCRIPTION OF THE DRAWINGS

Apparatus embodying features of my invention are depicted in the accompanying Drawings which form a portion of this disclosure and wherein:

FIG. 2 is a side elevational view of the vertical conveyor and cutting station of the first embodiment;

DESCRIPTION OF THE PREFERRED EMBODIMENTS

Figure 1:
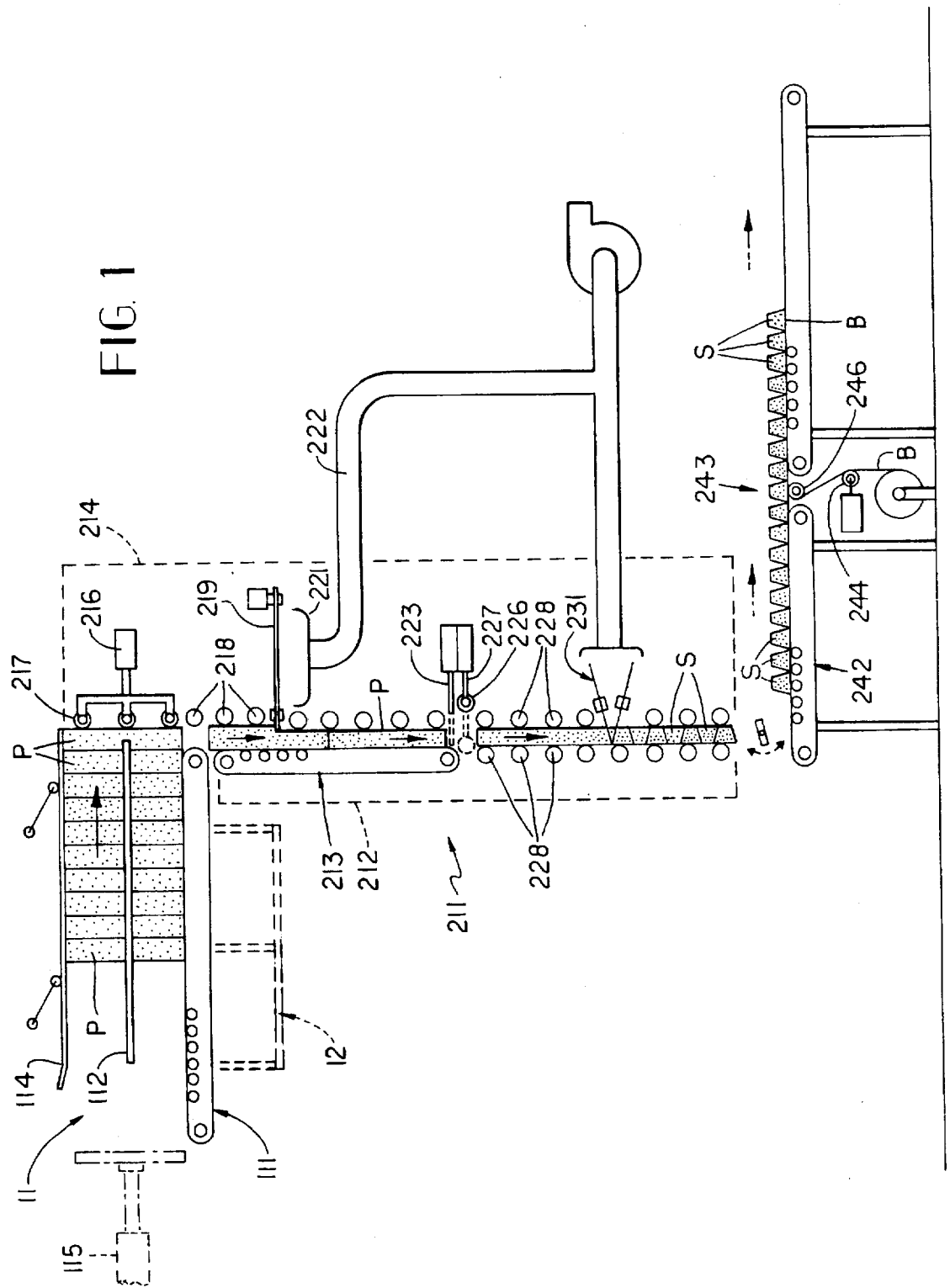
FIG. 1 is a side elevational view of a first embodiment of the system.

Referring to the Figures for a clearer understanding of the invention, it may be seen that in FIG. 1 our system is shown having a loading station 11, wherein a pallet of insulation material panels P is loaded such that the individual panels are vertically oriented. Typically such panels are rectilinear having substantially uniform width and length dimensions, for example 18"×24", or 24"×24". Depending on the type of panel material the thickness may vary over the panel. Station 11 includes a support frame 12 of any suitable construction on which an endless belt conveyor 111 is supported. Above conveyor 111 are a set of lateral guides 112 extending longitudinally relative to the upper run of the conveyor and which are adjustable on arms (not shown) to accommodate panels of selected dimensions. Guides 112 serve to properly maintain the lateral position of the panels on the conveyor 111. In an alternative, mechanism a indexing ram 115 may be provided to urge the panels along the path defined by guides 112, however k is believed that conveyor 111 provides a superior loading mechanism.

Mounted above conveyor 111 and adjustable in height to accommodate selected dimensions of panel material is a biasing arm 114 mounted on parallelogram supports such that minimal resistance is offered to the top of the panel as they move with the conveyor, yet resistance is afforded should one or more of the panels start to tip rearward. The arm may be appropriately biased by springs or a pneumatic actuator. Conveyor 111 terminates at a vertical station 211 which includes side frame 212 in which an upper continuous belt conveyor 213 is mounted. Vertical station 211 also includes a movable frame 214 which is parallel to frame 212 spaced therefrom in accordance with the thickness of the insulation panels to be cut, i.e. one to four inch thick panels may be accommodated. Frame 214 supports a pneumatic restraint 216 which includes at least one roller 217 mounted on the end of a movable rod in position to engage a vertically oriented exposed surface of a panel presented by conveyor 111. Beneath pneumatic restraint 216, frame 214 supports a set of drive rollers 218, mounted on resilient beatings which urge the rollers against the surface of a panel positioned between conveyor 213. Frame 214 also supports a horizontally oriented band saw 219 which is used to size the panels in terms of thickness. A scrim scroll 221 is positioned just below band saw 219 to direct removed scrim away from the sized panel for disposal. A vacuum plenum 222 operably connected to a remote vacuum source is carried beneath the leading edge of the scroll 221 to remove dust and debris generated by the band saw.

Also mounted on frame 214 beneath the band saw 219 is a horizontally movable stop 223 which is movable into the space between frame 212 and 214. Stop 223 arrests the downward movement of the panel material P such that a glue application roller 226 may be positioned beneath the lower edge of the panel to apply glue thereto. A limit switch on a carriage 227 movably supporting roller 226, controls the retraction of the supports such that the panel is allowed to descend onto the roller, whereupon glue is applied as the roller is retracted from beneath the panel. A second set of limit switches are actuated when the upper edge of the panel passes beneath the stop and actuate the stop. A limit switch actuated by the full extension of the stop, triggers a timer which signals the carriage to position the roller 226 for application of glue to the next panel.

Beneath the glue roller 226 are additional drive rollers 228 supported frames on 212 and 214. Supported beneath the drive rollers 228 is a severing mechanism 231. The severing mechanism may be one or more circular saws mounted for movement horizontally across the material, inclined relative to the plane of the panel to cut the opposing converging sides of a trapezoid thereby severing the material, one or more band saws mounted for like movement, or depending on the material one or more industrial cutting lasers mounted for like movement. In any case the severing mechanism is adjustable in inclination and in height above a sensor positioned beneath the interstice between frame 212 and 214. Sensor provides a control signal indicating that the lower edge of the panel is positioned such that the severing mechanism can sever a selected increment of the panel.

In as much as the severing mechanism forms trapezoidal segments S of the material, it becomes necessary to properly orient the trapezoids with common sides aligned for the application of a connective backing material. Initial orientation may be accomplished as the severing mechanism 23 1 completes its action by urging the segment in a selected horizontal direction such that it is constrained to lay on the selected side. A moving conveyor 242 passing beneath sensor, thus carries a series of like oriented segments to an application station 243 where a layer of backing material B is applied as described in U.S. Pat. No. 5,302,228, owned by the assignee of the instant application.

Intermediate the severing station 23 1 and the application station 243, the segments S must be placed in abutting relationship with the sides of the trapezoidal segments which are to be bonded to the backing B being coplanar and in edge to edge abutment. If the segments are resting on the appropriate side after severing they can be brought into proper edgewise alignment by adjusting the speed of the feed conveyor 242 delivering the segments to application station 243. At the application station, the backing may pass over a spreader roll 244 which transfers adhesive from a reservoir to the backing on the selected side thereof an then to an idler roll 246 which tensions and positions the backing B to receive insulation segments on the adhesive coated surface. The backing B thus unifies the segments S into a length of pipe wrap such that the unified material may be transversely severed and folded with the backing on the outside side and the inclined faces of the trapezoid urged against one another to form a pipe wrap of a selected diameter.

Figure 4:
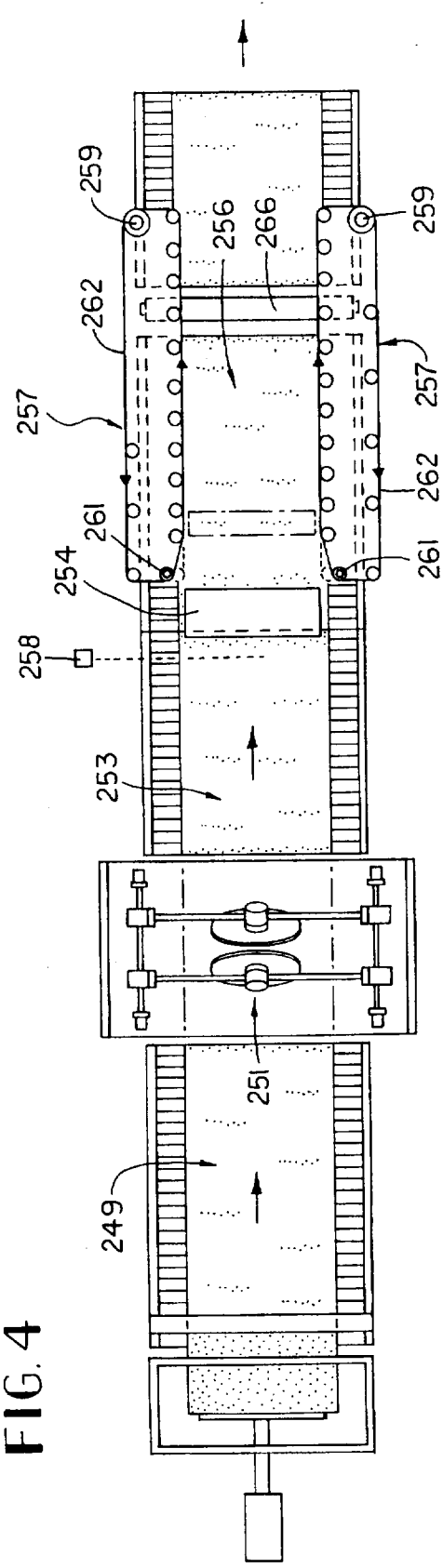
FIG. 4 is a plan view of the second embodiment.
Figure 3:
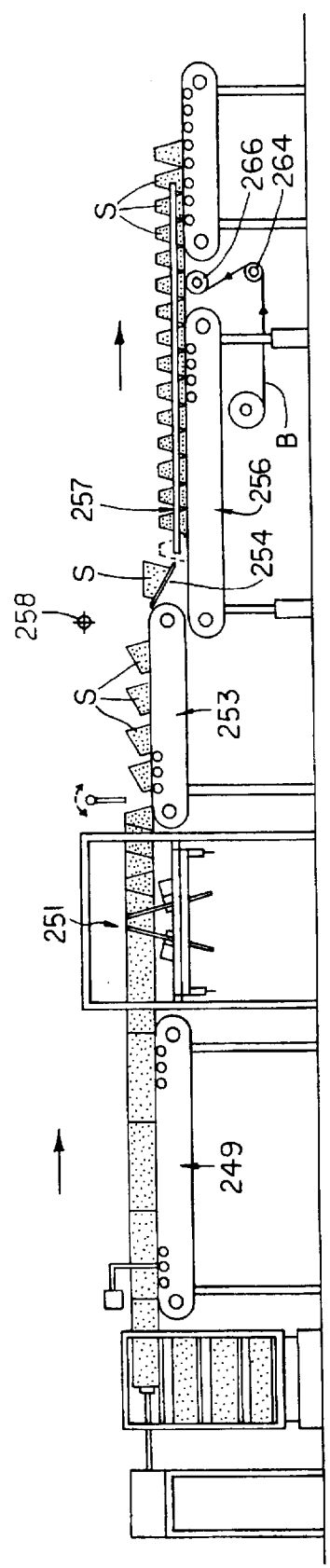
FIG. 3 is a side elevational view of a second embodiment.

In a second embodiment as shown in FIGS. 3 and 4, the arrangement of elements shown in U.S. Pat. No. 5,302,228 is modified such that the severing mechanism 251 is not used to cut v-grooves but rather to cut trapezoidal segments as ribbon of material passes over a severing station. It will be appreciated that this action will create complementary trapezoidal sections such that every other section will need to be rotated 180 degrees relative to its adjacent segments to position the segments with appropriate sides in abutting relationship. For convenience, the sides of the trapezoidal segment will be defined such that there two inclined surfaces connecting a wrap side and a pipe side wherein the wrap side is to be adhered to the backing material and the pipe side is to be urged against the pipe to be wrapped. If the trapezoidal segment is stable on its wrap surface when cut then the adjacent segments will rest on their pipe surface and will probably be unstable in that motion along the conveyor or gravity will cause such segments to tumble onto one of the inclined sides. If the output conveyor from the severing station 251 is moving at a slightly higher speed than the input conveyor 249, a separation will be created between a stable segment and the subsequent unstable segment such that the unstable segment will tip forward into the space created as the conveyors index. Passing the segments over a transition where a subsequent conveyor is at a lower elevation will leave the stable segments in their original position and will cause the overlain segments to tip onto the stable or wrap side, whereupon backing may be applied as in the first embodiment.

In some instances where small diameter pipe is to be wrapped with relatively thick insulation, neither the wrap or pipe side are stable and all of the segments fall to an inclined side. In this instance the segments must all be oriented with the wrap side in the same relative position. It is within the contemplation of the invention that the segments be manually oriented or oriented mechanically.

One form of mechanical orientation apparatus is shown in FIGS. 3 and 4, and is similar to that used in the first embodiment in that a pair of stays 252 mounted on an axis for rotation are cooperatively positioned proximal the severing station 251 to engage the segments S as and after they are severed. Stays 252 abut the top portion of the segments and tip the segment forward or backward relative to the direction of travel of the conveyor 253 such that the segments are all similarly oriented onto a respective inclined side with the wrap side forward as the conveyor moves.

Conveyor 253 delivers the segments to a ramp 254 to a lower conveyor 256 which includes a lower conveyor surface supporting the segments and lateral endless band stabilizing conveyors 257 which gently engage the ends of the segments after delivery from the ramp. Conveyor 253 moves the segments past a sensor 258 such as a photocell which detects the presence of the segment about to be delivered and actuates a movable portion of the stabilizing conveyors. As will be noted in FIGS. 3 and 4 the stabilizing conveyors 257 have a drive pulley 259 and a plurality of idler pulleys about which the belt or belts are driven. The drive pulley is coordinated with the support conveyor such that the linear speed of the drive belt matches the linear speed of the supporting conveyor thus the segments are urged along the conveyor by gentle pressure along the bottom and two ends. A pair of idler pulleys 261 adjacent the ramp are mounted on a plate for lateral translation by an actuator without varying the tension in the belt 262 such that a portion of the stabilizing conveyor may be moved away from the support conveyor 256 so that a segment may be delivered to the support conveyor from the ramp 254 resting upright against the ramp on its wrap side without engaging the stabilizing conveyor. The stabilizing conveyors 257 may then be moved into engagement with the ends of the segments and the conveyors are indexed forward a distance to allow the next delivered segment to be placed vertically behind and adjacent the segments engaged by the stabilizing conveyors. As will be noted the stabilizing conveyors 257 are mounted at a height near support conveyor 256 such that trapezoidal segments of varying width are engaged near their widest part. The discharge length of the ramp 254 may be varied to accommodate the dimensions of segments for various pipe diameters.

It will be appreciated that backing B may be applied to the wrap surface while the stabilizing conveyors engage the ends, by passing the backing B over an applicator roller 264 and then an idler roller 266 to position the backing beneath the segments intermediate the stabilizing conveyors. As noted above the unitized segments and backing may be cut in appropriate lengths to wrap around a specific pipe size.

While I have shown my invention in one form, it will be obvious to those skilled in the art that it is not so limited but is susceptible of various changes and modifications without departing from the spirit thereof.

What we claim is:

1. Apparatus for forming a substantially rigid tube made from a plurality of longitudinally extending trapezoidal segments of a material having a defined thickness, comprising in combination:

a. means for severing a bat of said material of said defined thickness to form faces aligned relative to a first surface of said material to iteratively form trapezoidal segments of said material wherein each trapezoid has a base side which forms a portion of the exterior of said tube, wherein the volume of said bat is substantially equal to the volume of said segments;

b. means for orienting each trapezoidal segment in a common orientation including means, mounted intermediate said severing means and an output conveyor, for engaging said segments and rotating said segments through a predetermined arc such that said segments are placed on said conveyor with the base side of each segment in a predetermined position;

c. means for abutting said trapezoidal segments along adjacent longitudinal edges thereof with said base sides thereof lying along a common plane, including a supporting conveyor adapted to support said segments on said base sides and means movable concomitantly with said supporting conveyor for engaging the ends of said segments laterally to maintain said segments orientation relative to said supporting conveyor as said segments move thereon; and, d. means for affixing a backing to said base sides to form an integral section of material for forming a tube by folding said integral section along said abutting longitudinal edges, including means for applying glue to one surface of an elongated sheet of backing material, means for introducing said elongated sheet beneath said base sides of said segments adjacent said supporting conveyor and beneath said means for engaging.

2. Apparatus as defined in claim 1 further comprising means for forming said bat of said material from a plurality of discrete panels thereof.

3. Apparatus as defined in claim 2 wherein said means for forming comprises a conveyor transporting a plurality of panels along a longitudinal axis proximal a gluing station wherein said panels are affixed in end to end relation.

4. Apparatus as defined in claim 3 wherein said conveyor comprises an indexing ram adapted for incrementally moving a plurality of said panels horizontally while said panels are in planar abutment.

5. Apparatus as defined in claim 4 further comprising means for moving a discrete panel along a vertical plane of alignment through a gluing station to abut a previously positioned panel in end to end vertical relation.

6. Apparatus as defined in claim 5 where in said means for severing is selected from the group of cutting tools consisting of circular saws, band saws, lasers, and knives, and wherein said means for severing is mounted for severing said bat along a plane transverse to the vertical plane of alignment.

7. Apparatus as defined in claim 1 wherein said means for affixing comprises a supply roll of backing material mounted for dispensation of said material in an elongated sheet, means for applying glue to one surface of said elongated sheet, means for introducing said elongated sheet beneath said base sides of said segments adjacent said supporting conveyor and beneath said means for engaging.

8. Apparatus as defined in claim 1 wherein said means for orienting comprises:

a ramp providing a downwardly sloping path from said output conveyor to a point above said supporting conveyor.

9. Apparatus as defined in claim 1 wherein said abutting means further comprises a sensor mounted proximal said output conveyor operably connected to advance said supporting conveyor responsive to the presence of a segment at a predetermined position on said output conveyor.

10. Apparatus as defined in claim 1 wherein said means for forming comprises a conveyor transporting a plurality of panels along a longitudinal axis proximal a gluing station wherein said panels are affixed in end to end relation, further comprising means for moving a discrete panel along a vertical plane of alignment through said gluing station to abut a previously positioned panel in end to end vertical relation superjacent said severing means.

11. Apparatus as defined in claim 1 wherein said orienting means further comprises a pair of resiliently mounted parallel disks mounted for driven rotation about a common central axis and for movement along said axis to engage the ends of each segment adjacent said severing means, said disks being selectively driven in either angular direction about said central axis.

\* \* \* \* \*

UNITED STATES PATENT AND TRADEMARK OFFICE
CERTIFICATE OF CORRECTION

PATENT NO. : 5,725,723

DATED : March 10, 1998

INVENTOR(S) : Cusick

It is certified that error appears in the above-identified patent and that said Letters Patent is hereby corrected as shown below:

Column 2, line28, replace"k" with --it--.

In Column 2, line 48, delete "beatings" and replace with --bearings--.

Signed and Sealed this

Nineteenth Day of May, 1998

Attest:

BRUCE LEHMAN

*Attesting Officer*    Commissioner of Patents and Trademarks